Sept. 3, 1935.  H. PHELPS ET AL  2,013,477
MACHINE FOR UNLOADING COTTON SEED AND OTHER COMMODITIES
Filed Feb. 20, 1931  2 Sheets-Sheet 1
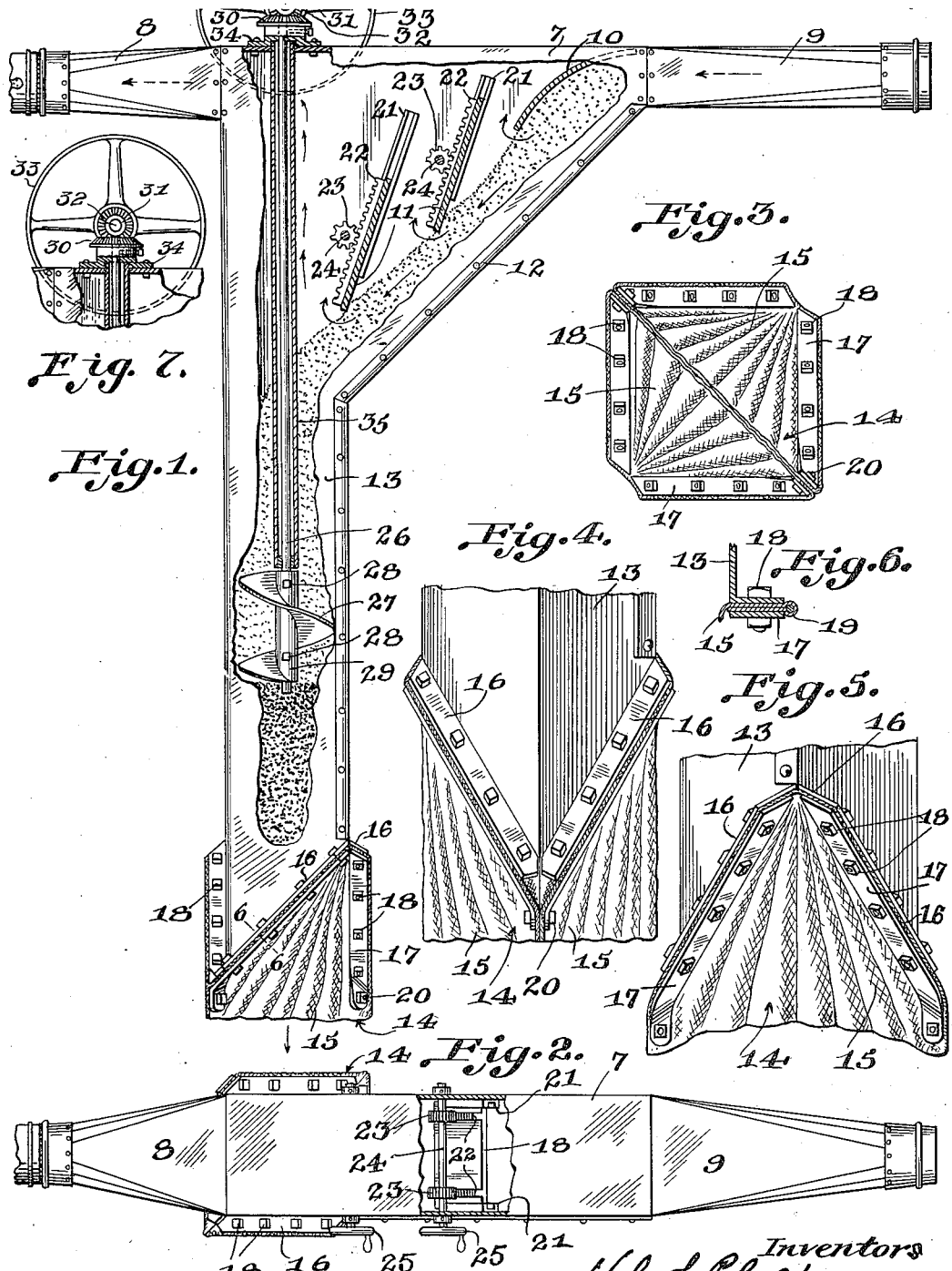

Sept. 3, 1935.  H. PHELPS ET AL  2,013,477
MACHINE FOR UNLOADING COTTON SEED AND OTHER COMMODITIES
Filed Feb. 20, 1931   2 Sheets-Sheet 2
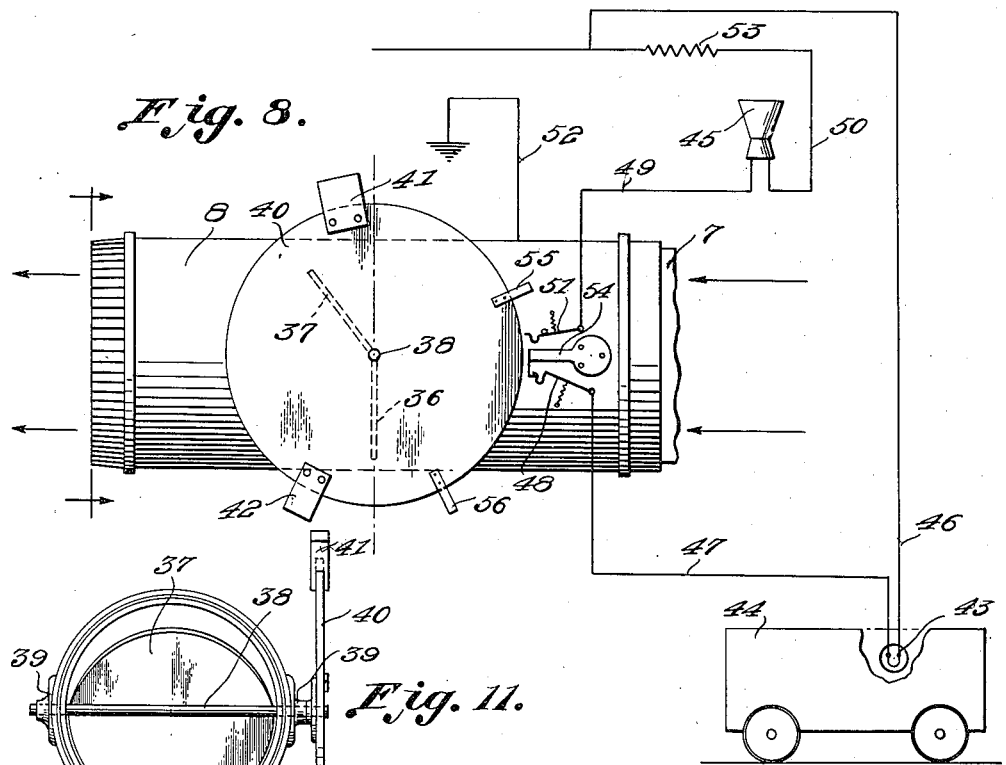
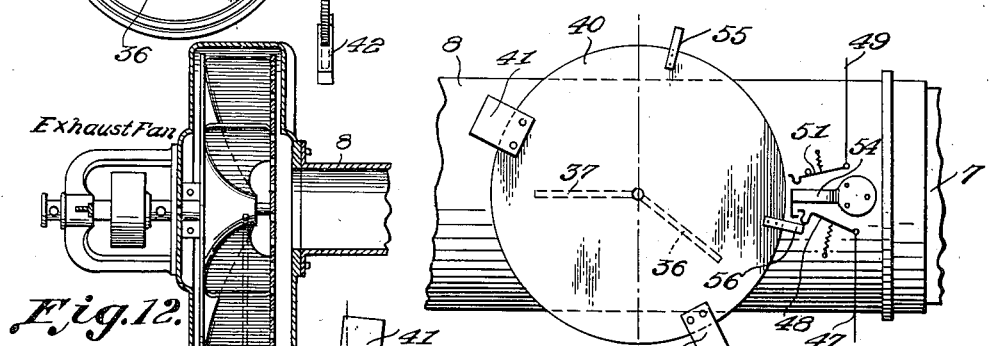
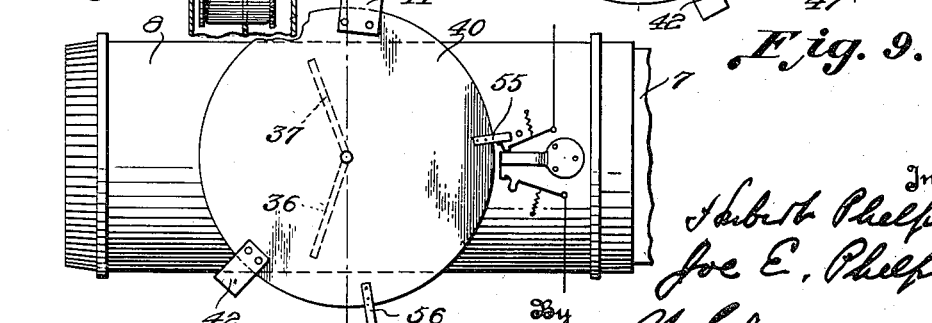

Patented Sept. 3, 1935

2,013,477

UNITED STATES PATENT OFFICE 2,013,477

MACHINE FOR UNLOADING COTTON SEED
AND OTHER COMMODITIES

Hubert Phelps and Joe Ethmar Phelps, Little Rock, Ark.; Hubert Phelps administrator of said Joe E. Phelps, deceased Application February 20, 1931, Serial No. 517,348

6 Claims. (Cl. 302—17)

This invention relates to improvements in unloading devices for the handling of cotton seed from box cars at cotton seed oil mills, but it will be understood from the present disclosure that this device is capable of unloading various commodities such as cotton seed, rice, shelled corn, and other grains and seeds. Besides unloading, the machine also cleans the cotton seed or grain, of sand, dust, leaf trash, and other foreign material that is lighter than the seed or grain being unloaded.

One object of the invention is to provide an unloading conveying apparatus operating on the suction principle with means for providing a substantially uniform rate of feed of material at the inlet to the suction line, so as to maintain the system working at substantially full normal capacity and at the maximum operating efficiency. Also to provide such a system with an unobstructed discharge passageway that will allow refuse foreign substances to be discharged from the machine instead of clogging screens usually employed in the discharge passageway. To the accomplishment of the foregoing and other objects specified, the invention consists in the features hereinafter fully described and then sought to be clearly defined by the appended claims.

In the accompanying drawings,

Figure 1 is a side elevation, partly broken away, to facilitate illustration;

Figure 2 is a top plan view of the same, partly in section;

Figure 3 is a bottom plan view of the drop leg and showing the flap valve in closed position;

Figure 4 is an enlarged side elevation of the lower portion of the drop leg, viewed from one edge of the same, and showing the flap valve in open position;

Figure 5 is a similar view of the drop leg, seen from another angle, and showing the valve in closed position;

Figure 6 is a sectional view of a detail on the line 6—6 of Figure 1;

Figure 7 a detail showing drive pulley and gears for operating a flight-conveyer feed;

Figure 8 is a side elevation of an exhaust pipe leading from an expansion or separating chamber and which will have communication with a motor operated exhaust fan, (see Figure 12) which may be of any well-known and approved type, an automatically operating valve being included for controlling the volume of air supplied to the fan, showing portion of the valve under normal feed conditions of material, through the suction line;

Figure 9 a similar view showing the position the valve assumes when the suction or feed line for the material is choked;

Figure 10 a similar view showing position of the valve when no material, or practically none, is being fed through the line;

Figure 11 is an end view, looking endwise into the exhaust pipe in the direction of the arrows of Figure 8;

Figure 12 a conventional illustration of an exhaust fan.

Referring to the drawings, 7 designates an expansion or separating box which is provided with a tubular discharge branch or arm 8 and a tubular entrance or inlet branch 9. The branch 8, in practice, is connected to some suitable suction device, such as a vacuum pump or fan, while the branch 9 is joined by any suitable means to a box car or the like which is to be unloaded. Obviously suction exerted through the branch 8, will cause the grain, cotton seed, or other material, to flow from the car through the branch 9, into the box 7, and to prevent the seed or grain from passing out through the branch 8, the box has a stationary baffle 10 and adjustable baffles 11. Each of these baffles extends downwardly toward the sloping bottom 12 of the box, so that the grain, cotton seed, or other material in flowing down said bottom, due to gravity, will be prevented from passing directly across the box and discharging through the branch 8.

The lower end of the box 7 communicates with the upper end of a tubular drop leg, chute or spout 13, which is preferably rectangular in cross section, and may be made of sheet metal. This leg or chute is considerably longer than the box, and is designed to hold a column of grain, cotton seed, or other material before it is automatically released or discharged, as will be explained hereinafter.

A flap valve 14 is located at the lower end of the drop leg or chute, and comprises a pair of flaps 15, preferably of flexible material. When the leg 13 is empty, and suction is exerted in the branch 8, these flaps, made of canvas or the like, will collapse or come together and close or seal the lower end of the drop leg. Then, as the grain or material flows into the drop leg, it will build up to the point where its weight will depress and open the flaps and permit the discharge of the grain, cotton seed, or other material from the drop leg.

Adjacent walls of the drop leg are cut away on downwardly extending diagonal lines and the edges of the diagonally extending portions are bent outwardly to form flanges 16 and thus are formed inverted V-shaped openings disposed diametrically opposite to each other, and each opening including or taking-in a portion of adjacent walls or sides of the drop leg, as indicated by Figs. 1, 4, and 5 of the drawings. These openings are occupied by the flap valves 15 formed of flexible material and each secured along two edges to the outwardly extending flanges 16 by means of plates or strips 17 and bolts 18 which clamp the flaps in position. It is preferred that the edges of the flaps be doubled over as shown in Fig. 6 of the drawings and have a cord or wire 19 lie in the fold so as to insure the edges of the flaps being securely held in position. The lower ends of the binding plates or strips 17 are extended beyond or below the lower ends of the flanges 16 so as to embrace the connecting edges of the flaps and serve as clamps for the meeting edges when drawn together by bolts and nuts 20.

When the flaps are formed and applied as shown and described each flap covers one of the inverted V-shaped openings at the lower part of the drop leg or chute and takes-in a portion of the two adjacent walls or sides of the drop leg, and forms practically a continuation of the side walls of the drop leg at the valve controlled discharge end of the leg or chute. When the drop leg is under suction the flaps are drawn upwardly and their free edges drawn together so as to close the discharge end of the chute or leg until the weight of accumulated material on the flexible valve exceeds the strength of the suction whereupon the valve opens and material is discharged from the leg or chute.

It may be seen as indicated by Figs. 4 and 5 of the drawings, that each wall of the drop leg has a downwardly inclined lower edge defined by the flanges 16, to which is attached opposite side edges of the flexible flaps 15, the lower portion of each flap having greater fullness than the upper portion, and consequently, when suction is exerted in the drop leg, the flaps move inwardly and contact with one another throughout a considerable area. When, however, the flaps move apart, due to the weight of the accumulated seed or grain, they define an opening of substantially the same area as the interior of the tube, so that the seed or grain will freely and quickly discharge from the drop leg or spout, at which time the flaps form practically a continuation of the side walls of the spout below the inclined edges of the walls.

Each one of the adjustable baffles in the expansion chamber or box preferably slides in channel-shaped guides 21 arranged at the sides of the box 7, and each of these baffles has racks 22 to mesh with pinions 23 on a shaft 24. An end of each of these shafts projects through a wall of the box and is equipped with a hand wheel 25 which may be manipulated for adjusting the baffles. These baffles deflect the inflowing cotton seed or grain downwardly towards the inclined bottom 12 down which it slides into the drop leg or trough 13 while the lighter or refuse material is drawn upward between the baffles by the suction through the expansion chamber and onward to and through the exhaust branch 8, the expansion chamber permitting a more thorough separation of the heavier from the lighter materials, the heavier dropping into the drop leg and the lighter passing on to the exhaust branch pipe and out through the same. The speed of travel of material through the expansion chamber from its inlet to its discharge may be controlled by adjustment of the baffles so as to afford sufficient time for the most efficient separation of the heavier and lighter materials while in the expansion chamber so that the heavier materials will pass into the drop leg and the lighter carried on to the exhaust branch or exit of the chamber more directly under the influence of the direct suction through the chamber without changing the force of the suction through the chamber. This control also dispenses with the necessity of a screen in proximity to the exhaust discharge from the expansion chamber which if employed soon becomes clogged and necessitates shutting down the operation to permit cleaning the screen, and also causes substantial variation in the suction through the expansion chamber. Under the present invention such inconveniences and delays in operation are remedied or obviated. Also for automatic delivery of material, cleaned of foreign refuse material, when the weight of the accumulated material on the valve becomes greater than the suction through the expansion chamber the flexible valve opens for discharge of the material and immediately closes when the weight of the material becomes less than the strength of the suction through the chamber without the necessity of breaking or cutting-off the suction, and thus a substantially continuous operation is assured, with all the advantages resulting therefrom.

To provide against any possible failure in the entirely satisfactory working of the device, attributable to conditions tending to impair the efficient working of the elements, such for instance as failure in the otherwise automatic actuation of the discharge valve due to the weight of the material being too light to overcome the vacuum or suction in the drop leg, I may produce a force-feed to assist in opening the valve under the existing vacuum or suction. To that end there is provided a conveyer-flight feed embodying a rotatable shaft 26 provided with a screw conveyer flight 27 attached to the rotatable shaft at a point above the automatic discharge valve 14. If the material to be discharged is lighter than the vacuum or suction in the leg the flight-conveyer feed will be disposed on the rotatable shaft at a point above the normal working level of the material, ascertainable from the character of the material being handled, so that if the material is too light to overcome the vacuum or suction in the drop-leg to open the valve, or should the suction line become clogged or choked from any cause, the material in the drop-leg will fill up the leg as far as the position of the force feed flight and then the positive feed of the conveyer flight will compensate for the difference in the vacuum or suction and assist the vacuum in the automatic action of the discharge valve. The flight conveyer feed is vertically adjustable on its rotatable shaft and may be secured to its adjustment by set screws 28 passing through the sleeve or hub 29 of the conveyer flight so as to bite the rotatable shaft to secure the flight to its adjustment. If desired, the conveyer flight feed may be adjusted to a lower position near enough to the valve to assist at all times the vacuum or suction for the automatic periodic actuation of the discharge valve without special regard to the character or condition of the material to be discharged. The rotatable shaft, which is in a state of suspension in the drop-leg, is extended through the top wall of the expansion chamber 7 and provided with a bevel gear 30 with which meshes a drive bevel gear 31 carried by a suitably supported shaft 32 having at one end a wheel or pulley 33 to which motion is given by hand or other power for rotating the flight carrying shaft, and a boxing 34 may be provided for the shaft where it passes through the top wall of the expansion chamber. If desired the rotatable shaft of the flight-conveyer feed may be encased above the conveyer flights in a tubular casing or shell 35 which may be stationary instead of rotatable in character, to prevent winding of cotton seed lint around or about the rotatable shaft.

It is desirable in operating a conveying system of this character to provide a substantially uniform rate of feed of material at the inlet to the suction line, to maintain the system working at substantially full normal capacity and at the maximum operating efficiency. If there is a deficiency in the supply of material, an overload is placed on the motor which drives the fan, due to the increased volume of air moved, which is not doing useful work. If on the other hand an excess of material be fed to the line, the flow of air is decreased and a choking may result, interfering with normal movement of the material. In either case, the variation in the rate of feed lowers the efficiency of the system. If means be employed to regulate the rate of feed of material to the suction line the disadvantages resulting from such variations of supply will be obviated. We therefore provide means, preferably visual or audible, or both, for indicating when insufficiency or excess of material is being supplied to the suction line, so that the insufficiency or the excess, as the case may be, can be remedied. An embodiment of the foregoing features is illustrated in Figures 8 to 11 of the drawings. In those figures the numeral 8 designates the exhaust pipe, corresponding in general to the exhaust pipe shown in Figures 1 and 2, leading from the separating or expansion box 7 and designed to connect with an exhaust fan conventionally illustrated in Figure 12 of the drawings. Within the exhaust pipe 8 is provided a valve, of the damper type, preferably comprising two vanes or wings 36 and 37 set at an angle one to the other and suitably attached to a shaft 38 rotatably mounted in suitable bearings 39 and provided at one end with a balance wheel 40. The upper part of the balance wheel is provided with a counter-weight 41 and the lower portion with a lighter counter-weight 42 positioned substantially in relation to a vertical line passing centrally through the balance wheel as illustrated in Figure 10 of the drawings, with the valve and counter-weights standing substantially as illustrated in that figure, assuming that no material is being fed into the suction line. Upon material being fed into the line it will be pulled by the suction from the fan and the air sucked through the exhaust pipe will be diminished, and gravitation of counter-weight 42 will rock the valve to the position indicated in Figure 8 where it is free to oscillate under normal working feeding conditions of the device. If now the suction line becomes choked or clogged from an excess of material being fed to the suction line there will be a smaller volume of air drawn through the suction line and supplied to the exhaust fan (Fig. 12) through the exhaust pipe 8, and at such time the valve and its counterweights will assume substantially the positions indicated in Figure 9. At such time the supply of material to the suction line should be cut down or lessened so that the rotary valve assisted by the counterweight 42 may resume normal working conditions, with the parts substantially in the positions indicated in Figure 8. We provide signalling means for indicating when there is being fed an excess of material to the suction line and also when there is deficiency in the supply. The preferred means is illustrated in Figures 8, 9, and 10. It comprises an electric circuit which includes a visual signal, for instance an electric lamp 43, adapted to be positioned within a car 44, or other receptacle from which material is to be unloaded and supplied manually or other-wise to the inlet pipe 9 of the suction line leading to the separating or expansion box 7 of the unloading device, and an audible signal, as a horn 45 which may be positioned at or in the vicinity of the receptacle or container 44. The circuit for the lamp or visual signal may be and preferably is a normally closed circuit comprising the wires 46 and 47, and switch 48 and the audible signal may be and preferably is a normally open circuit comprising wires 49 and 50 and switch 51 and grounded through the pipe 8 and wire 52, and may contain a resistance 53 as illustrated in Figure 8. A contact member 54 is provided for the switches 48 and 51 in making and breaking the two signal circuits.

With the valve 36, 37, in the position shown in Figure 8, material is feeding under normal conditions, from the car or receptacle being unloaded, and the circuit of the audible signal broken, and the circuit of the visual signal closed, thus indicating to the unloading attendant, that the material is being fed to the suction line under normal conditions. If from any cause the normal feeding of the material ceases the valve assumes the position shown in Figure 10 and a contact member on the balance wheel 40 contacts with the switch 51 as shown in said figure and the audible signal sounds an alarm which indicates to the attendant that the normal feeding of the material has been interrupted and the attendant thereupon takes steps to see that the deficiency of material is rectified so that the requisite additional material is supplied to restore normal working conditions, whereupon the valve assumes its position for normal working conditions as indicated in Figure 8 of the drawings, the audible signal circuit at such time being broken as indicated by the drawings. Under some conditions an excess of material is fed to the suction line so that the line becomes choked and insufficient air admitted to the suction line for supply to the exhaust fan. When that is the case the valve takes the position indicated in Figure 9, in which position a stop member 56 on the balance wheel contacts with the switch 48 as shown in Figure 9 and breaks the circuit of the visual signal so that the lamp-light is extinguished and the attendant warned that the line is choked with material and he thereupon cuts down the excess supply of material so as to restore normal working conditions. It will be noted from the foregoing that one signal indicates to the attendant that there is a deficiency in supply of material, and the other indicates an excess of material supply so that he knows whether to supply additional material or to cut-down the excess. The volume of air supplied to the exhaust fan depends on the volume of air passing through the suction line, and that volume is incidentally regulated or controlled by the quantity of seed in the suction line and the positions assumed by the valve whose actuation is dependent on the quantity of material fed to the suction line. This secondary or incidental control of the volume of air supplied to the exhaust fan incidentally due to the volume of material supplied to the suction line also exerts a modifying influence on the separation of the particles of material in the expansion or separating chamber or box as said chamber constitutes a part of the suction line of the machine and a more nearly uniform feed of material into and through the separating or expansion box is obtained and more effective separation produced.

The automatically operating valve functions the same whether positioned on the discharge side of the fan, or on the intake side, so long as it is in the air line (considering the discharge side of the fan as part of the air line) although it is preferably positioned on the intake side as illustrated in the drawings.

We have illustrated a practical embodiment of the features of the invention, and have described with particularity the preferred details of the various parts but changes may be made therein and essential features of the invention retained as sought to be defined in the appended claims.

The terms and expressions employed herein are used as terms of description and not of limitation, and there is no intention in the use of such terms, and expressions, of excluding any mechanical equivalents of the features shown and described, or portions thereof, but it is recognized that various structural modifications are possible within the scope of the invention claimed.

Having described the invention and set forth its merits, what is claimed is:

1. In a suction line conveyer for cotton seed and similar material in communication with a source of material supply and through a portion of which the material is moved by suction; means for creating suction in the suction line, a valve located within the suction line, a balance wheel connected to the valve and operable under fluctuations in the supply of material to the line to automatically indicate the volume of air supplied to the suction creating means, and signals operated by the balance wheel in extreme positions thereof to thereby indicate an excess or deficiency in supply of material to the line, and thus determine when to increase or decrease the supply of material, at will, to meet conditions as and when required.

2. In a suction line conveyer in communication with a source of material supply and through a portion of which the material is moved by suction; means for creating suction in the suction line, a rotatable valve located in the line and operable under fluctuations in the supply of material to the line to automatically indicate the volume of air supplied to the suction creating means and thereby indicate an excess or deficiency in supply of material to the suction line, and a balance wheel operatively connected with the valve.

3. In a suction line conveyer in communication with a source of material supply and through a portion of which the material is moved by suction; means for creating suction in the suction line, a rotatable valve located in the line and operable under fluctuations in the supply of material fed to the line to automatically indicate through excess or deficiency in the supply of material the volume of air supplied to the suction creating means, a signal for indicating an excess of material in the line, and another signal for indicating a deficiency of material in the line, said signals being operatively connected with the valve for functioning under conditions stated.

4. A suction line conveyer comprising a suction line including an expansion chamber and having an intake for material and an air outlet, means for creating suction in the suction line, valve-means controlling discharge of material separated in the expansion chamber, said means operative under accumulation of material to open the valve for discharge of material and to close under suction to cut-off discharge of material, a valve located in the suction line and operable under fluctuations in the supply of material fed to the line to automatically indicate the volume of air supplied to the suction creating means, a weighted balance wheel connected with the valve, and signals controlled thereby to indicate an excess or deficiency in supply of material to the line.

5. A pneumatic conveyer comprising, in combination, a suction line having an intake end, a motor driven air pump connected with the opposite end of the suction line and adapted to draw air through the latter, a material collector in the suction line, and a valve in the suction line arranged between the air pump and material collector, said valve being operable by and in response to velocity of air passing through the line whereby the load on the motor is maintained substantially constant.

6. A pneumatic conveyer comprising, in combination, a suction line for conducting material to a collector and provided with an intake end, a motor driven air pump connected with the opposite end of the suction line and adapted to draw air and material through the line, a material collector in the suction line, a valve in the suction line between the air pump and collector, and means constantly urging the valve in the direction of opening movement, said valve being operable in the direction of closing movement by and in response to the velocity of air passing through the line upon variations in amount of material passing through the line whereby to maintain the load on the motor substantially constant.

HUBERT PHELPS.
JOE ETHMAR PHELPS.